July 4, 1944.  J. BAUM  2,352,759
ELECTRICAL BATTERY
Filed Oct. 15, 1942  2 Sheets-Sheet 1

INVENTOR
JASPER BAUM
BY S. Michael Priele
ATTORNEY

July 4, 1944.                J. BAUM                2,352,759
                        ELECTRICAL BATTERY
                      Filed Oct. 15, 1942          2 Sheets-Sheet 2

INVENTOR.
JASPER BAUM
BY S. Michael Prinzler
ATTORNEY

Patented July 4, 1944

2,352,759

UNITED STATES PATENT OFFICE 2,352,759

ELECTRICAL BATTERY

Jasper Baum, Bronx, N. Y., assignor to Sonotone Corporation, Elmsford, N. Y., a corporation of New York Application October 15, 1942, Serial No. 462,139

2 Claims. (Cl. 136—133)

This application is a continuation-in-part of my application Serial No. 264,677, filed March 29, 1939, as a continuation of application Serial No. 128,100, filed February 27, 1937.

This invention relates to electrical batteries and it has particular relation to portable batteries suitable for wear in the pocket of a person, such as those used in wearable hearing-aid devices.

The conventional dry battery cells, of the type used for hearing aids, flash lights, etc., generally consist of a zinc container which serves as one electrode and as container for the central carbon electrode, the electrolyte and the interposed depolarizing mix, the zinc container being usually enclosed in a cardboard casing, the upper end of which is sealed with a sealing compound. Such battery cell becomes frequently defective due to generation of a large volume of fluid of a high internal pressure sufficient to burst the container and the outer casing. These troubles have long been a source of great difficulties, particularly when used by deafened persons as a part of a wearable hearing aid, since the expelled fluid often causes injury to the clothing and body of the user.

The invention overcomes the foregoing difficulties by placing the cell-electrode container in an elastically-yieldable bag, of rubber, for instance, having at its upper open end a thickened border portion which is interlockingly sealed in the hardened sealing compound which is used to enclose the upper end of the cell casing, so as to prevent the thickened border portion from being pulled out of said interlocking engagement by the pressure of fluid expelled from the cell and assure that all liquid expelled from a cell container is intercepted in the space within said bag enclosed by said sealing compound. Flash light battery cells may be enclosed in such rubber bags having at both ends openings with thickened border portions interlockingly sealed in hardened sealing walls enclosing both ends of the cell casing, each sealing wall having a centrally exposed terminal element arranged to establish series circuit connections between superposed stacked cells.

The foregoing and other objects of the invention will be best understood from the following description of the exemplifications thereof, reference being had to the accompanying drawings wherein Fig. 1 is a diagrammatic view of a wearable hearing-aid device equipped with an electrical supply battery;

Most of the deafened are very sensitive and seek to conceal their impairment. Accordingly, a satisfactory hearing-aid device for supplying a deafened person with amplified hearing-inducing sound energy must not only be able to respond to the required important speech frequencies and operate satisfactorily under all conditions of use without special attention and frequent reconditioning, but they must also be suitable for comfortable and inconspicuous wear on the body of the user.

Figure 1:
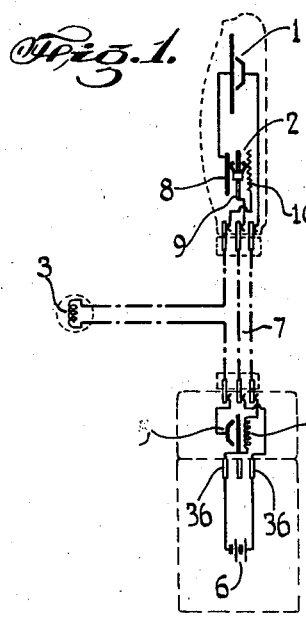

As shown diagrammatically in Fig. 1, such hearing-aid usually consists of a transmitter microphone 1 with a control unit 2 which supplies amplified sound frequency currents to an actuating winding 3 of a hearing-inducing receiver, by means of a microphone amplifier unit consisting of an amplifier winding and an amplifier microphone 5, interconnected with a small supply battery 6, the transmitter microphone 1 and the receiver winding 3 by a cord 7. The supply battery is, as a rule, the heaviest element of the hearing-aid and is worn either in a pocket of the clothing or in a bag strapped to a body portion of the user.

In operation, the battery 6 must supply current not only to the primary circuit leading from one pole of the battery through the amplifier winding, the common supply cord lead to the slider contact 9 of the control unit 2, and therefrom by way of the transmitter 1, back through a return cord lead to the other battery terminal, but also the secondary circuit branching off from the slider contact 9 over the receiver winding 3 and the amplifier microphone 5 to the other battery terminal.

Accordingly, the battery which must be small enough to be worn hidden in the pocket of a user is called upon to deliver a large amount of electric energy in order to enable the user to take full advantage of the hearing-air. As a result a large current is drawn from the battery and the battery is subjected to a heavy drain.

The majority of the wearable hearing-aids now on the market are operated by means of batteries composed of one, two or three series-connected Le Clanche cells of the dry type. Such cells usually consist of a container of zinc which forms one electrode and houses a carbon-manganese dioxide mixture which forms the other electrode, and an ammonium chloride electrolyte which is held partly by an absorbent separator interposed between the active electrode elements to permit electrolytic but prevent metallic conduction.

The electrochemical energy conversion by which current is supplied from such cell is accompanied by complicated chemical reactions which bring about the dissolution of the zinc from the container electrode and the evolution of heat in the cell. These actions depend on the degree of purity of the cell elements, as well as on the rate of the current discharge, and are erratic. Usually the amount of zinc consumed is greater than the amount equivalent to the electric current furnished to the external circuit, and some zinc is dissolved without producing current. Frequently local corrosion of the zinc is caused by unevenness in the distribution of the electrolyte. Occasionally impurities in the ingredients are precipitated by the electrolyte in the separator producing internal short-circuits and cause rapid deterioration of the cell.

Since most of the deafened operate the hearing-aid continuously for prolonged periods of time, the heavy current drain aggravates the reactions in some of the battery cells, causing the generation of a high internal pressure sufficient to burst or split a cell wall and expel electrolyte and other reaction products from the battery casing. These battery troubles have long been a source of annoyance and are injurious to the deafened because the excretions expelled or discharged from the battery cause damage to the clothing of the user or give him the sensation of a burn when they penetrate to his skin.

The invention overcomes these difficulties by providing each cell container with a skin-like leakproof yieldable enclosing coating having an opening at a level higher than the top of the cell so that electrolyte or any other liquid excretions from the cell are intercepted within the casing.

In a battery of the invention, the cell is enclosed in an individual bag or coating of elastically yieldable tight material, such as rubber, which clings to the walls of the cell container and projects above the top of the container. With such battery, a troublesome reaction causing the cell to burst its container wall and expel excretions will not discharge the excretions outside the battery casing, but the excretions will be retained in blister-like bulges formed by the yielding protective bag of the defective cell.

In the case of a battery formed of several series-connected battery cells individually sealed in such bags, the battery will remain operative even if one of the cells becomes defective due to a short-circuit in the cell. Accordingly, the improved battery will not only protect the user against damage by the excretions of the defective cell, but the externally intact battery unit will enable him to continue to use his hearing-aid with the internally damaged battery until he finds it advisable to replace it with another one.

Figure 2:
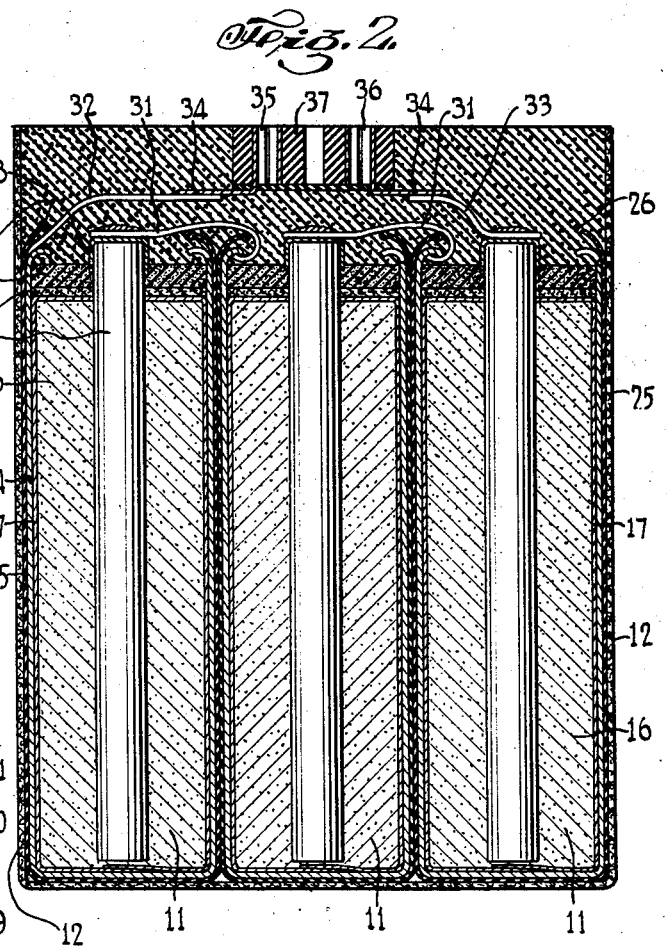
Fig. 2 is a vertical sectional view through a battery exemplifying the invention along line 2—2 of Fig. 3.
Figure 4:
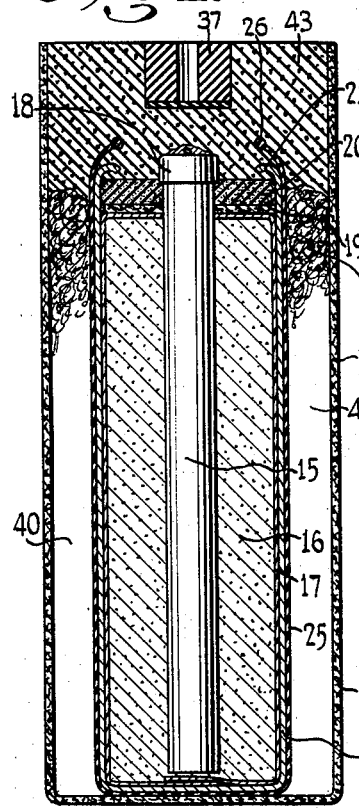
Fig. 4 is a vertical sectional view of the battery along line 4—4 of Fig. 3.
Figure 3:
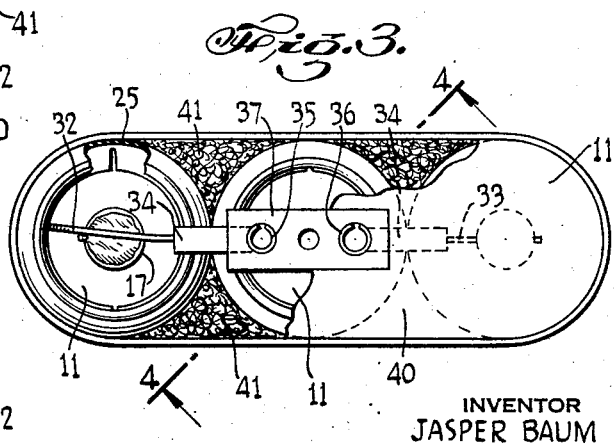
Fig. 3 is a plan view of the battery with some of the parts exposed.

A hearing-aid dry cell battery exemplifying the invention is shown in Figs. 2 to 4. It comprises three battery cells 11 fitting into a flat casing 12 formed of cardboard or similar material suitable for insertion into a pocket of the user. Each cell consists of a zinc container 14 which forms one cell electrode. In the interior of the container 14 is mounted a carbon rod 15 with a surrounding depolarizing mix 16 which forms the other electrode and is separated from the zinc container by a porous insulating separator 17, of paper, for instance, and the electrolyte required for the electrochemical energy conversion in supplying current to an external circuit connected to the electrode. The zinc container and a cap 18, of brass or similar material, clamped to the top of the carbon rod serve as the cell terminals of opposite polarity.

The space within the cell container 14 and its contents are covered by an annular disc 19, of paper, for instance, fitting between the carbon rod 15 and the container wall to prevent contamination of the contents.

In order to prevent damage to the battery by expulsion or leakage of electrolyte or other excretions from a defective cell, a leakproof coat or bag 25, of rubber, for instance, is slipped over each cell 11, the upper edge of the rubber having a reinforced bead-like formation 26 projecting for a distance above the top of the cell to retain within the rubber bag any excretions expelled through the top of the cell.

The flat casing 12 is so proportioned that when the three cells 11 with the rubber enclosures 25 are inserted into the casing in the way shown in Figs. 2 to 4, the adjacent cells are held in place and are insulatingly separated from each other by the double layers of the rubber coatings of each cell. This cell arrangement leaves hollow longitudinal cavities 40 between the adjacent cells which may be plugged up at the top by wads 41, of cotton, for instance, in the way shown in Figs. 3 and 4. Alternatively, the entire length of the cavities 40 between the adjacent cells may be filled with a porous substance, such as cotton.

The several cells 11 of the battery are connected in series by soldering conductor strips 31 to the zinc container of one cell and the carbon rod cap 18 of the adjacent cell in the way shown in Fig. 2. To provide the external connections of the battery cells to the hearing-aid circuit in the way shown in Fig. 1, conductor strips 32, 33 leading from the zinc container of one end cell and from the brass terminal 18 of the other end cell, respectively, are soldered to the outwardly bent tail strips 34 of split resilient terminal sleeves 35, 36 of opposite polarity mounted in openings of a socket block 37 of insulating material which is held in position in the upper casing opening by its connecting strips 32, 33.

After the several battery cells 11 with the socket block 37 are positioned within the casing, a suitable insulating thermoplastic sealing compound 43 is poured, while liquid, into the hollow space of the casing above the cells till the entire space is filled, so that upon congealing of the compound, the several cells are firmly held in place and the upper crimped edges of the cell containers 14 as well as the beaded edges 26 of the outer rubber sacks of the individual cells terminating above the level of the container edges are imbedded and locked by the solidified compound. As shown in Figs. 2 and 3, an additional layer 20 of porous material for absorbing gases or excretions expelled through the top of the individual cells may be placed in each cell container before assembly, but these layers may be omitted and the entire space above the closure disc 19 of each cell may be filled with the sealing compound while the top of the casing is filled.

Figure 5:
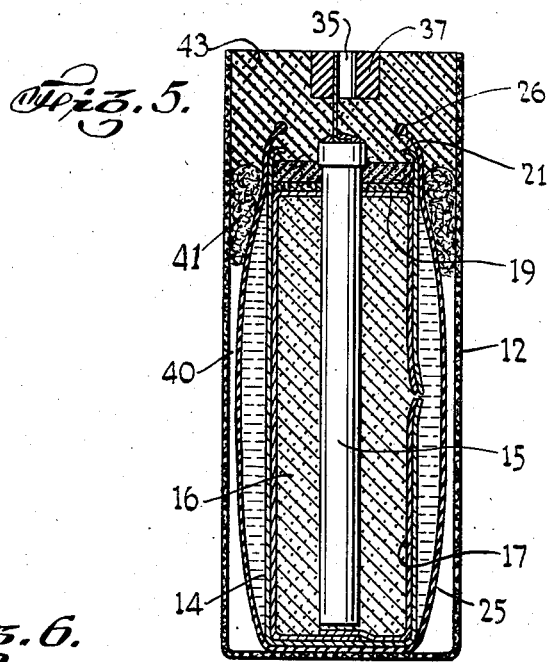
Fig. 5 is a view similar to Fig. 4 showing the cell with the fluid expelled from the container into the rubber bag.

When a defect, such as a short circuit, occurs in a battery of the type described above, and the fluid produced therein is sufficient to burst a wall of the casing and expel it through an opening in the wall, no leakage will occur, but the liquid will be expelled into a space confined within the expanded rubber bag in the manner indicated in Fig. 5.

Figure 6:
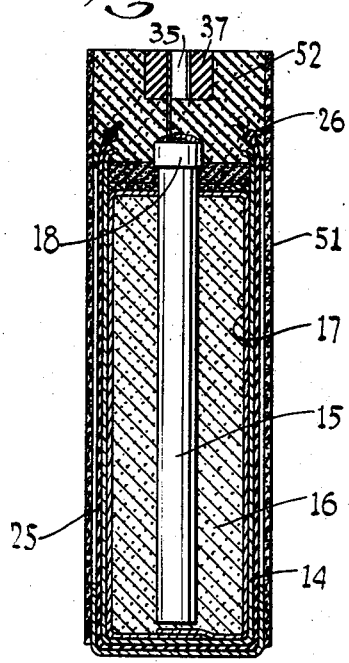
Fig. 6 is a cross-sectional view of a single cell battery of the type shown in Fig. 2.

The principles of the invention lend themselves also for the construction of single cell batteries, such as shown in Fig. 6. The cell constructed in the manner described in connection with Figs. 2 and 3 is mounted in a cylindrical cardboard casing 51 fitting over the complete cell and its rubber bag 25, and the upper part of this casing is enclosed by a filling of sealing compound 52 which seals the open end of the casing and the space above the cell, the sealing compound forming an upper sealing wall in which is imbedded the beaded enlarged upper border portion 26 of the bag so as to form an interlocking engagement with the sealing wall sufficiently interlocked.

Figure 7:
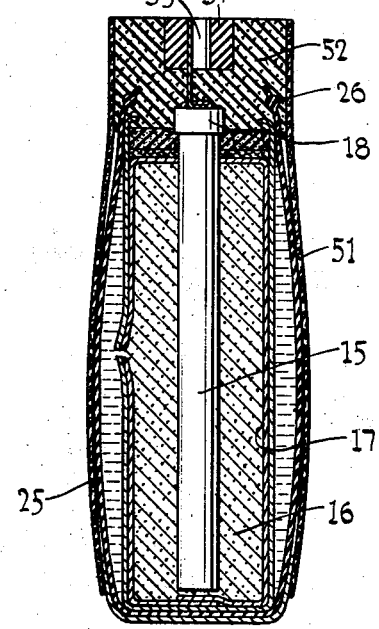
Fig. 7 is a view similar to Fig. 6 showing the cell with the fluid expelled from the container into the rubber bag.

The interlocking thickened portion 26 along the upper edge of the bag 25 is made sufficiently thick and so shaped and the sealing wall 52 which forms an interlocking clamping engagement therewith is of such composition and hardness that fluid expelled from a burst defective cell into the bag will cause it merely to expand in the manner indicated in Fig. 7, without being sufficient to pull out the upper thickened portion 26 of the bag from its engagement with the sealing wall, notwithstanding the fact that as a result of the expansion the thickness of the rubber bag is reduced.

As shown in Fig. 7, if a single cell is enclosed in such a bag, the pressure of the expelled fluid will be so great as to bring also an expansion of the walls of the cardboard casing surrounding it. However, the yieldable bag is foolproof protection against leakage. A cell of the foregoing type is thus superior to other proposed cells intended to give such protection.

It will be apparent to those skilled in the art that the novel principles of the invention disclosed herein in connection with specific exemplifications thereof will suggest various other modifications and applications of the same.

Thus, the individual rubber bags 25 may have somewhat longer upper extensions arranged to hold a quantity of absorbent material, such as porous cotton, below the level of the sealed beaded edge portion to permit gas or liquid excretions expelled through the top of a cell container to be absorbed by the porous filling. Similarly, the rubber coatings of individual cells may be separated by partition strips of paper or similar material.

It is accordingly desired that in construing the breadth of the appended claims, they shall not be limited to the specific exemplifications of the invention described herein.

I claim:

1. In a battery of a hearing aid worn in the clothing of the user or the like, a battery casing open at the top, a primary cell located within said casing, a portion of the exterior of said cell constituting a substantially solid container enclosing its interior, a unitary upwardly-opening elastically-yieldable bag of liquid-tight material surrounding the bottom and side walls of the cell container and substantially clinging to the side walls thereof, the top portion of said bag extending substantially above the top of said container and having an opening bounded by a thickened border portion located below the upper level of said casing, a body of hardened liquid-tight sealing compound enclosing said casing opening and said bag opening so as to seal the upper end of said casing and bag and form a sealing wall maintaining interlocking clamping engagement with the inner and outer sides of the thickened upper border portion of said bag, and terminal elements fixedly held by said sealing compound within the top of said casing and interconnected to the electrodes of said cell, said cell and the surrounding bag being so arranged and shaped and so sealed by said compound within said casing as to intercept within said bag liquid and gases expelled from any portion throughout the height and the top of the cell and to prevent expelled liquid from reaching the walls of said casing, the thickened border portion of said bag being of such shape and its interlocking engagement with said sealing wall being sufficiently strong as to prevent said thickened border portion from being pulled out of said interlocking engagement with said sealing wall by the pressure of fluid expelled into said bag.

2. In a battery of a hearing aid worn in the clothing of the user or the like, a battery casing open at the top, a plurality of interconnected primary cells located within said casing, a portion of the exterior of each cell constituting a substantially solid container enclosing its interior, a unitary upwardly-opening elastically-yieldable bag of liquid-tight material surrounding the bottom and side walls of each cell container and substantially clinging to the side walls thereof, the top portion of said bag extending substantially above the top of said container and having an opening bounded by a thickened border portion located below the upper level of said casing, a body of hardened liquid-tight sealing compound enclosing said casing opening and said bag openings so as to seal the upper end of said casing and bags and form a sealing wall maintaining interlocking clamping engagement with the inner and outer sides of the thickened upper border portion of each of said bags, and terminal elements fixedly held by said sealing compound within the top of said casing and interconnected to the electrodes of said cells, each cell and its surrounding bag being so arranged and shaped and so sealed by said compound within said casing as to intercept within said bag liquid and gases expelled from any portion throughout the height and the top of the cell and to prevent expelled liquid from reaching the walls of said casing, the thickened border portion of each of said bags being of such shape and its interlocking engagement with said sealing wall being sufficiently strong as to prevent said thickened border portion from being pulled out of said interlocking engagement with said sealing wall by the pressure of the fluid expelled into the bag.

JASPER BAUM.